No. 879,618. PATENTED FEB. 18, 1908.
E. E. FLYBERG.
SCISSORS.
APPLICATION FILED OCT. 26, 1907.
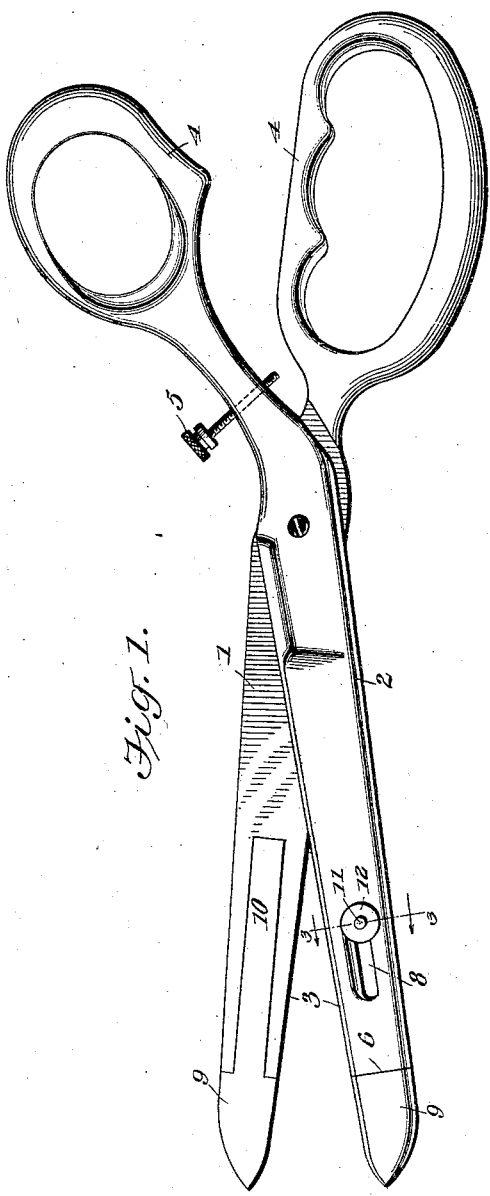
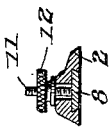
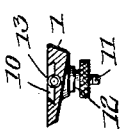
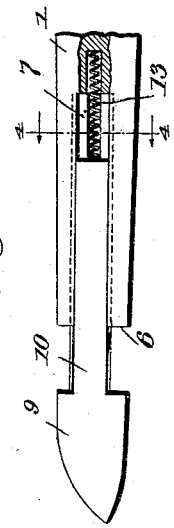
WITNESSES
INVENTOR
ESTHER E. FLYBERG.
BY
ATTORNEYS

UNITED STATES PATENT OFFICE.

ESTHER ELIZABETH FLYBERG, OF BAUDETTE, MINNESOTA.

SCISSORS.

No. 879,618. Specification of Letters Patent. Patented Feb. 18, 1908.

Application filed October 26, 1907. Serial No. 399,360.

*To all whom it may concern:*

Be it known that I, ESTHER ELIZABETH FLYBERG, a citizen of the United States, and a resident of Baudette, in the county of Beltrami and State of Minnesota, have made certain new and useful Improvements in Scissors, of which the following is a specification.

My invention is an improvement in scissors and consists in certain novel constructions and combinations of parts hereinafter described and claimed.

Referring to the drawings forming a part hereof—Figure 1 is a plan view of the scissors. Fig. 2 is a view of one blade with the point extended. Fig. 3 is a section on the line 3—3 of Fig. 1, and Fig. 4 is a section on the line 4—4 of Fig. 2.

The present embodiment of the invention comprises a pair of pivoted blades 1, 2, provided with the usual cutting edge 3 and handle 4, one of the blades being provided with a set screw 5, for a purpose to be presently described. The blades proper are provided with squared ends 6, and on their inner faces adjacent to the end with a recess 7, having under-cut edges as shown in Figs. 3 and 4, and each blade is provided with a slot 8 extending to the outer face of the blade as shown in Fig. 1. A detachable point 9 is provided for each blade, the said point being provided with a shank 10 shaped to fit the recess 7 and slidable therein, and a spring 13 is arranged between the inner end of the shank and the recess as shown in Fig. 2, the said spring acting normally to force the point away from the end of the blade. Each shank is provided with a threaded stem 11, extending through the slot 8, and a thumb nut 12 is threaded onto the stem for securing the point in its adjusted position.

When the points are in the position shown in Fig. 1, the scissors may be used for ordinary work, and when it is desired to cut button holes, the thumb nuts 12 are turned to release the points, when the spring 13 will force them into the position shown in Fig. 2. By turning the set screw 5, the length of the button holes may be accurately gaged, the said set screw limiting the closing movement of the blades.

I claim—

1. A pair of scissors provided with blades having squared ends, the inner faces of the blades being provided with guideways adjacent to the squared ends, and an extensible point for each blade, each of said points being provided with a shank engaging the guideway, a spring arranged between the end of the shank and the end of the recess and acting normally to force the point away from the blade, each of the blades being provided with a slot and each of the shanks with a threaded stem projecting through the slot, and a thumb nut on the stem for clamping the point in its adjusted position.

2. A pair of scissors provided with blades having squared ends, the inner faces of the blades being provided with guideways, and an extensible point for each blade forming a continuation of said blade, each of said points being provided with a shank engaging the guideway, a spring acting normally to force the point away from the blade, and means for securing the point in its innermost position.

3. A pair of scissors provided with blades having extensible points forming continuations of the blades, each of said blades being provided with a guideway, and each of the points with a shank for engaging the guideway of the respective blades, means for moving the points longitudinally away from the blades, and means for clamping them in their adjusted position.

4. A pair of scissors provided with blades having extensible points forming continuations of the blades, each of said blades being provided with a guideway, and the point with a shank engaging the guideway, and means for adjusting the point with respect to the blade.

5. A pair of scissors provided with blades having points forming continuations of the blades movable longitudinally toward and away from the blade, means for securing the points in their adjusted position, and means for limiting the movement of the blades toward and from each other.

6. A pair of scissors comprising pivoted blades provided with detachable points forming continuations of the blades, means for moving the points longitudinally of the blades, and means for clamping the points in their adjusted position.

ESTHER ELIZABETH FLYBERG.

Witnesses:
S. M. KAEFOD,
FRED CHESKA.